United States Patent
Ren et al.

(10) Patent No.: US 10,055,307 B2
(45) Date of Patent: Aug. 21, 2018

(54) WORKFLOWS FOR SERIES OF SNAPSHOTS

(71) Applicant: VMware, Inc., Palo Alto, CA (US)

(72) Inventors: Joanne Ren, Palo Alto, CA (US); David W. Barry, San Francisco, CA (US); Keith Farkas, Palo Alto, CA (US); Mike Zucca, Palo Alto, CA (US); Martin Valkanov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 475 days.

(21) Appl. No.: 14/755,375

(22) Filed: Jun. 30, 2015

(65) Prior Publication Data
US 2017/0004051 A1    Jan. 5, 2017

(51) Int. Cl.
*G06F 9/455* (2018.01)
*G06F 11/14* (2006.01)
*G06F 11/00* (2006.01)

(52) U.S. Cl.
CPC .......... *G06F 11/1464* (2013.01); *G06F 11/00* (2013.01); *G06F 11/1469* (2013.01); *G06F 2201/84* (2013.01)

(58) Field of Classification Search
CPC ....... G06F 2009/45562; G06F 9/45558; G06F 2009/4557; G06F 11/14; G06F 11/2028; G06F 11/2069; G06F 11/2097; G06F 3/061; G06F 3/065; H04L 67/34
USPC ........................... 718/1; 707/639, 610; 711/6
See application file for complete search history.

(56) References Cited

U.S. PATENT DOCUMENTS

| | | | |
|---|---|---|---|
| 8,291,411 B2 | 10/2012 | Beaty et al. | |
| 9,009,106 B1* | 4/2015 | Aron | G06F 11/14 707/610 |
| 2010/0036885 A1* | 2/2010 | Shen | G06F 11/2028 707/640 |
| 2010/0153617 A1* | 6/2010 | Miroshnichenko | G06F 3/061 711/6 |
| 2012/0203739 A1* | 8/2012 | Soundararajan | G06F 9/5077 707/639 |
| 2012/0246640 A1* | 9/2012 | Marshall | G06F 9/45558 718/1 |
| 2013/0024940 A1* | 1/2013 | Hutchins | G06F 9/45558 726/24 |
| 2013/0055258 A1 | 2/2013 | De et al. | |
| 2013/0117359 A1* | 5/2013 | Husain | H04L 67/34 709/203 |
| 2013/0185716 A1* | 7/2013 | Yin | G06F 9/45558 718/1 |
| 2014/0229939 A1 | 8/2014 | De Assuncao et al. | |

* cited by examiner

*Primary Examiner* — Dennis Truong
(74) *Attorney, Agent, or Firm* — Fish & Richardson P.C.

(57) ABSTRACT

The present disclosure is related to methods, systems, and machine-readable media for workflows for series of snapshots. A server can manage replication of a number of series of snapshots of a virtual computing instance (VCI). An on-host agent can replicate a parent series of the number of series of snapshots to at least one child series of the number of series of snapshots. The parent series can precede the at least one child series in the number of series of snapshots. A change in the parent series can be propagated to the child series. Management of the replication of the numbers of series of snapshots can be switched from the server to a different server.

19 Claims, 6 Drawing Sheets

WORKFLOWS FOR SERIES OF SNAPSHOTS

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

As software defined data centers become increasingly popular and widespread, an increasing number of consumers deploy VCIs on third-party hypervisors. As used herein, a "third-party hypervisor" includes components (e.g., hypervisors and/or VCIs) provided by a different party that a party that provides a cluster controller and/or high availability support. In some examples, a third-party hypervisor can use a configuration profile that is different than a configuration profile used by the party that provides the cluster controller and/or high availability support. Although a container provided by a container virtualization layer of a VM may not have the same configuration profile as the hypervisor on which the VM is deployed, this does not necessarily mean that the hypervisor is "third-party" with respect to the VM itself because the VM and the hypervisor may operate using the same configuration profile.

The deployed VCIs can be created from data stored in external data storage (e.g., a cloud storage device). External data storage can include what is referred to as a "blob" store, or binary large object store, or from files stored on a block storage device. A blobstore can include a collection of binary data stored as a single entity in a database management system (e.g., a cloud storage device). The data in the blobstore can be arranged such that the blobstore can freely pack data independently of how the data is presented to an agent that extracts the data from the blobstore. In this way, the arrangement of data in the blobstore can be based on blobstore specific priorities such as bandwidth cost, storage space, a number of HTTP requests, etc. For example, using a blobstore as a storage device includes storing data separated from a layout associated with the stored data. The layout can be how portions of the data are arranged in relation to other portions of data and include how associations of the data are used by an external source (such as a host to create a VCI from the data extracted from the blobstore but in a specific layout for the VCI). In contrast, a series stored on block storage is stored in a format that may not be known to the underlying file system. For example, the snapshot series may be stored using a sparse snapshot format offered by a proprietary hypervisor.

Embodiments in accordance with the present disclosure can provide for workflows associated with series of snapshots of a VCI. Workflows can include selecting a server and/or a host to manage a number of VCIs. Workflows can include recovering a failed VCI.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1A:
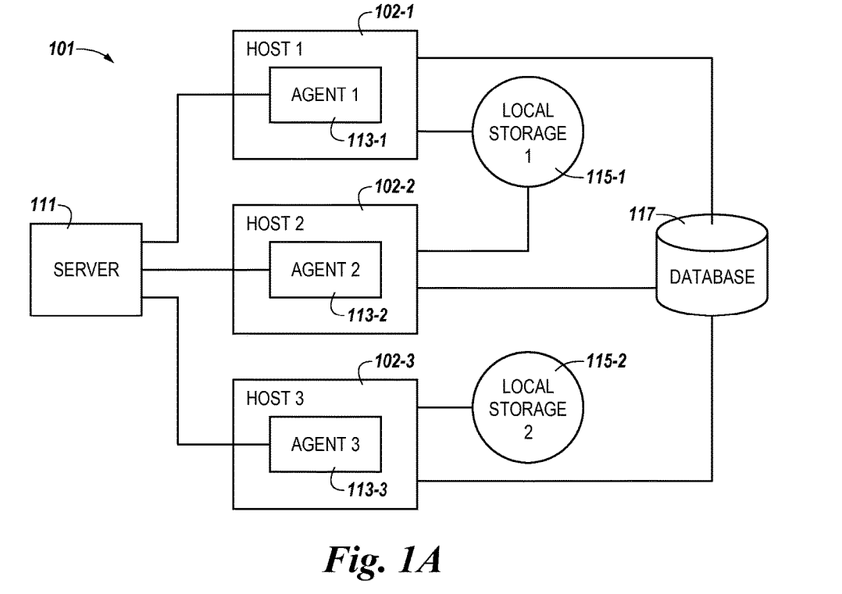
FIG. 1A is a block diagram of a system for workflows for series of snapshots according to a number of embodiments of the present disclosure.

FIG. 1A is a block diagram of a system 101 for workflows for series of snapshots according to a number of embodiments of the present disclosure. As shown in FIG. 1, the system 101 can include a host based replication (HBR) manager 111. In some embodiments, the HBR manager 111 can be implemented as a server. The HBR manager 111 can provide the ability to replicate VCIs, including replication between dissimilar storage. HBR manager 111 can manage replication of a number of series of snapshots of a virtual computing instance (VCI). Replication can refer to copying a VCI as a snapshot, copying a series of snapshots of a VCI into a first series, copying a series of snapshots of a first series into a second series, etc. An HBR manager 111 can be a centralized server that caches user policies for replication configuration including an RPO, a retention policy, etc. The HBR manager 111 can manage scheduling of replications (e.g., the timing and frequency of replications). The HBR manager 111 can perform replication job management, orchestration of recovery of series of snapshots, and monitor and collect statistics about VCIs and their corresponding series of snapshots.

As used herein, a "snapshot" is a file that includes information regarding a VCI. For example, a snapshot can include metadata (e.g., config files, nvram files, etc.) regarding a VCI. In some embodiments, a snapshot can include persisted state changes to a VCI that have occurred since a previous (e.g., last) snapshot was taken, for example, a snapshot can include information associated with incremental changes to a VCI since a previous snapshot was taken. Advantageously, a snapshot can include secondary copies of a state of a VCI. Snapshots can be taken periodically and can be copied and/or stored, as described in more detail herein.

A snapshot can have a particular point in time (PIT) associated therewith. In some embodiments, the PIT can be a time that the snapshot was taken. A plurality of snapshots can be taken at different points in time and can be stored in a particular order to form a snapshot series. In some embodiments, a snapshot series can include a plurality of sequentially (e.g., chronologically ordered) captured snapshots. Embodiments are not limited to storing snapshots in a particular order; however, and a snapshot or snapshots can be copied or otherwise moved from one snapshot series to another snapshot series. Herein, "snapshot series" and "series of snapshots" are used interchangeably.

Two or more series of snapshots can be organized in various ways. For example, two or more series of snapshots can be organized in a cascade relationship or a fan-out relationship. In a cascade relationship, a snapshot of a VCI can be taken, copied into a first series of snapshots, and then copied into a second series of snapshots. In contrast, a fan-out relationship can be achieved by taking a snapshot of a VCI and copying the snapshot into both the first series of snapshots and the second series of snapshots concurrently. In some embodiments, a recovery point objective, as described in more detail herein, can be used to govern copying of snapshots into the various series.

In some embodiments, information contained in one or more snapshots can be used to recover a persisted state of a VCI at a given PIT. That is, a VCI can be recovered to a given PIT by copying information associated with a snapshot with a particular PIT, or by combining information associated with two or more snapshots corresponding to the VCI. In some embodiments, an amount of data that can be lost in the event of a VCI failure can be bounded or limited by managing and scheduling series of snapshots.

The system 101 can include a number of hosts 102-1, 102-2, 102-3 and a number of agents (e.g., Agent 1, Agent 2, Agent 3, respectively) 113-1, 113-2, 113-3 on each of the respective hosts 102-1, 102-2, 102-3. The hosts 102-1, 102-2, 102-3 can be included in a software defined data center. The system 101 can include local storages (e.g., Local Storage 1, Local Storage 2, respectively) 115-1, 115-2, and database 117. Local storages can be an on-premises storage device that stores an online source series. That is, to recover from a VCI failure, a copy of the VCI can be directly created from a snapshot series stored on a database, whereas, to recover from a series stored in a database, the data must be downloaded first. The local storages can store database references to objects in cloud storage (e.g., a blobstore). A host can be coupled to a specific local storage. For example, hosts 102-1 and 102-2 are coupled to local storage 1 115-1 and host 102-3 is coupled to local storage 2 115-2. Hosts 102-1, 102-2, and 102-3 are coupled to database 117. Database 117 can be a cloud storage database.

In some examples, an agent can be within each host (as illustrated in FIG. 1A as Agent 1 113-1 is within Host 1 102-1, for example) in a storage system. Each agent can be managed by one or more HBR managers (e.g., servers), such as HBR manager 111. On-host agent 113-1 can map snapshots to object files associated with the snapshots that are stored in database 117. It can also access snapshots stored on local storage (e.g., local storages 115-1, 115-2). On-host agent 113-1 can be an S3-compatible application program interface (API) wrapper. Replication of a series of snapshots (e.g., a stored online series) performed by agent 113-1 can be based on the user policies and/or availability of a series of snapshots (e.g., an online series stored in local storage 1 115-1 or local storage 2 115-2). The replication of the series of snapshots can be performed by an agent and each agent can be selected by the HBR manager to perform the replication. Replication can refer to making copies of an online series of snapshots stored in a local storage (e.g., an on-premises storage such as local storage 1 115-1 and/or local storage 2 115-2) to at least one of another online storage device (e.g., local storage 2 115-2) and/or a cloud storage device (e.g., database 117 and/or a blobstore within the cloud storage device).

Figure 1B:
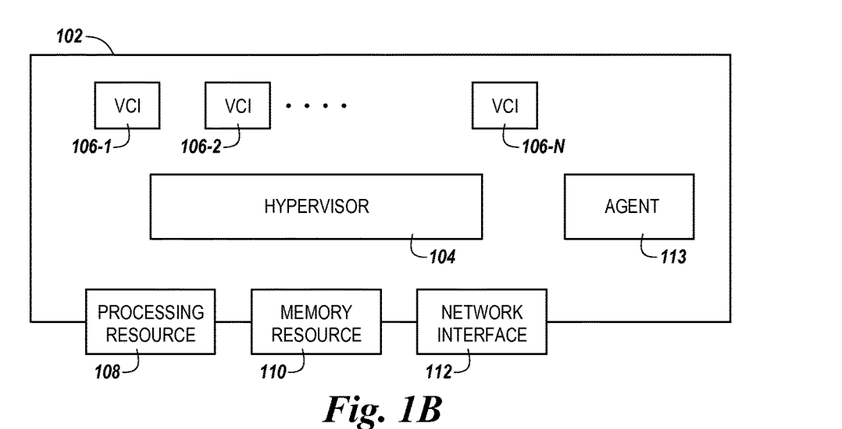
FIG. 1B is a block diagram of a host within a system for workflows for series of snapshots according to a number of embodiments of the present disclosure.

FIG. 1B is a block diagram of a host 102 within a system for workflows for series of snapshots according to a number of embodiments of the present disclosure. The host 102 illustrated in FIG. 1B can be analogous to any of the hosts 102-1, 102-2, 102-3 illustrated in FIG. 1A. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. Memory resources 110 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. The host 102 can include an on-host agent 113.

The on-host agent 113 can replicate a parent series (e.g., Series A 223-1 in FIGS. 2A and 2B) of a number of series of snapshots to at least one child series (e.g., Series B 223-2 in FIGS. 2A and 2B) of the number of series of snapshots. For example, a parent series of VCI 106-1 can include a number of snapshots that are replicated to a child series of snapshots for VCI 106-1. A change in the parent series of VCI 106-1 can be propagated to a child series of the parent series of VCI 106-1. Likewise, a parent series for VCI 106-2 and a parent series for VCI 106-N can be replicated to a number of child series associated with VCIs 106-2 and 106-N, respectively.

In some examples, two agents can be used to replicate a series of snapshots. A first agent can manage the copying of series of snapshots to a recovery site that has computing capabilities (e.g., local storage). A second agent can manage the copying of series of snapshots stored in a recovery site without computing capabilities (e.g., stored to a blobstore in cloud storage). The recovery site without computing capabilities can be a blobstore that stores the data separate from layout data associated with the data. That is, the blobstore does not compute with the data and, because of this, does not need the layout data. The recovery site with computing capabilities (e.g. local storage) can include the layout data with the data because the data can be used in compute operations at this recovery site.

Referring back to FIG. 1A, HBR manager 111 can select a particular agent, such as one of agents 113-1 to 113-3 to perform a number of replication operations on hosts 102-1 to 102-3, respectively. The particular agent can be selected based on an ability to perform a replication of a number of snapshots of a series (described below). While a single HBR manager 111 is illustrated, examples are not so limited. For example, additional HBR managers not illustrated can be a part of system 101 and coupled to host 102-1 and agent 113-1, host 102-2 and agent 113-2, and host 102-3 and agent 113-3. That is, a network of HBR managers (such as HBR manager 111) can be coupled to a network of hosts and agents (such as hosts 102-1 to 102-3 and agents 113-1 to 113-3).

In some examples, a host can access a snapshot stored on local storage that is accessible only from a different host. For example, the host could provide an FTP server from which a snapshot of the host can be fetched by the different host. A remote snapshot access engine could facilitate a fetching of a snapshot from the host to the different host. In some examples, an agent (e.g., agent 2 113-2) can write data into a series of snapshots that is stored in local storage (e.g., local storage 2 115-2) that is not accessible by the agent (e.g., agent 2 113-2). For example, a server (e.g., HBR manager) 111 can include an ability to receive data from a remote location (e.g., database 117) that includes data from local storage 2 115-2 and write it into the series of snapshots associated with agent 2 113-2 even though agent 2 113-2 is not able to access local storage 2 115-2. In some examples, server (e.g., HBR manager) 111 can provide a datapath for agent 2 113-2 to write data into a series of snapshots that are stored in local storage (e.g., local storage 2 115-2) not accessible by agent 2 113-2.

Figure 1C:
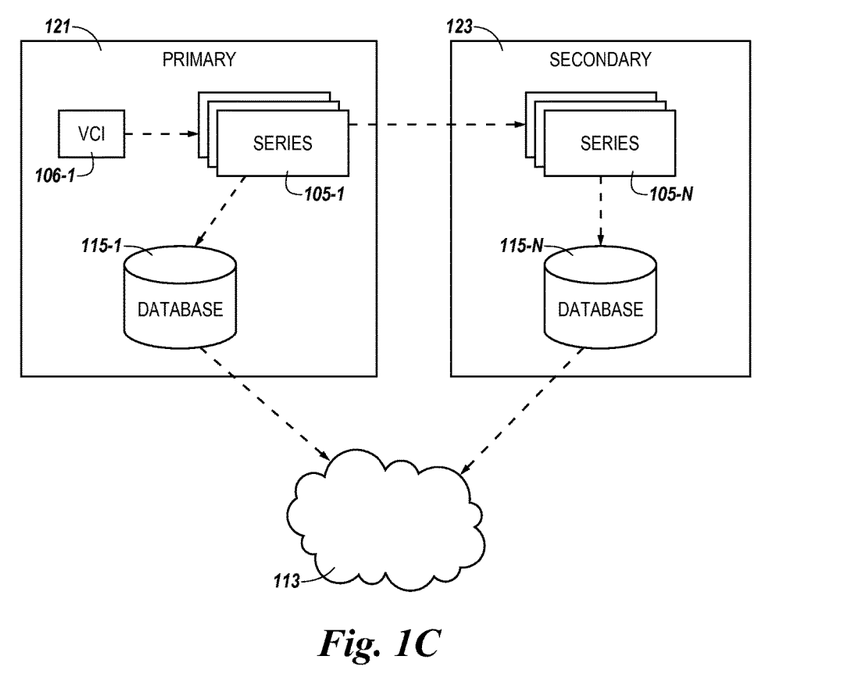
FIG. 1C is a block diagram of a topology for scheduling and managing series of snapshots according to a number of embodiments of the present disclosure.

FIG. 1C is a diagram of an example topology for scheduling and managing series of snapshots according to the present disclosure. In some embodiments, a VCI 106-1 can be located at a primary site 121. A snapshot can be taken of a first VCI 106-1. The snapshot can be copied to a first snapshot series 105-1. In some embodiments, the snapshot can be copied to a second snapshot series 105-2 (illustrated as 105-N) located at a secondary site 123 and/or can be copied to a data store 115-1 associated with the primary site 121. In some embodiments, the second snapshot series 105-N can be copied to a data store 115-N associated with the secondary site 123. In some embodiments, the first snapshot series 105-1 and/or the second snapshot series 105-N can be copied to a remote storage location 113 from a respective data store 115-1, 115-N. In this regard, series of snapshots can be scheduled and managed, as described in more detail herein. In some embodiments, remote storage location 113 can be a cloud storage location, a blob store, etc. In some embodiments, a blob store can be configured as an agent that can store metadata associated with snapshots and/or series of snapshots. In some embodiments, a blob store can store semantic metadata associated with a VCI in order to map information in the blob store to the VCI and vice versa.

For example, a snapshot of VCI 106-1, located at the primary site 121 can be taken. In some embodiments, the snapshot can be copied into the first snapshot series 105-1 and then copied into the second series 105-N. In this example, the first snapshot series 105-1 and the second snapshot series 105-N can be organized in a cascade relationship. In some embodiments, the RPO can be used to govern the copying of the two snapshot series 105-1, 105-N. That is, the two snapshot series 105-1, 105-N can be cascaded such that the RPO is maintained. In some embodiments, additional back-up and/or redundancy can be provided to at least one of the snapshot series 105-1, 105-N by copying at least one of the snapshot series 105-1, 105-N into a respective data store 115-1, 115-N.

In some embodiments, the RPO can be specified for at least one of the snapshot series 105-1, 105-N. For example, a RPO of 15 minutes can be specified for the second snapshot series 105-N. This RPO can be relative either to a first snapshot series (e.g., snapshot series 105-1) or to a VCI state associated with a VCI (e.g., state of VCI 106-1 associated with series 105-1) that is stored in a data store (e.g., data store 115-1 in FIG. 1A). In some embodiments, the snapshot scheduling and management system (e.g., snapshot scheduling and management system 101 illustrated in FIG.

1A) or a replication agent and/or a replication agent server (e.g., replication agent 113 and/or replication agent server 102, illustrated in FIG. 1B) can ensure that snapshot copies are not older than the RPO value with respect to the first snapshot series 105-1 or the data store 115-1 associated with the VCI 106-1.

Figure 2A:
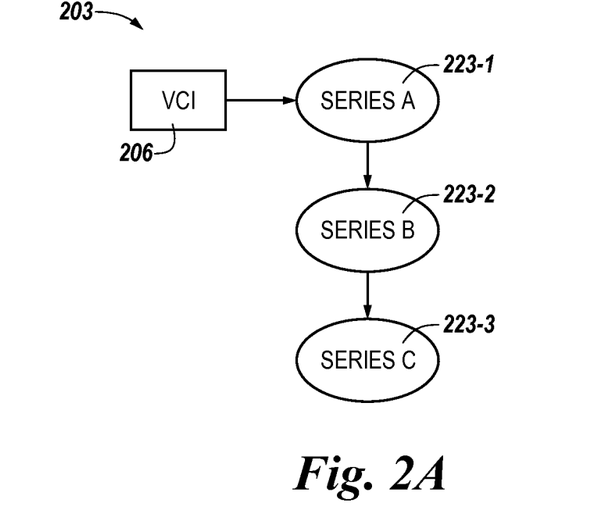
FIG. 2A is a block diagram of a cascade of series of snapshots according to a number of embodiments of the present disclosure.

A series of snapshots can be arranged in a number of ways including as a cascaded series and as a fan-out series. In a cascade relationship, a snapshot of a VCI can be taken, copied into a first series of snapshots, and then copied into a second series of snapshots. In contrast, a fan-out relationship can be achieved by taking a snapshot of a VCI and copying the snapshot into both the first series of snapshots and the second series of snapshots concurrently. FIG. 2A is a block diagram of a cascade 203 of series of snapshots according to a number of embodiments of the present disclosure. VCI 206 can include a number of series of snapshots associated with VCI 206 such as Series A 223-1, Series B 223-2, and Series C 223-3. As described above, each snapshot includes a particular state of a VCI at a particular time point. The series of snapshots illustrated in FIG. 2A is a cascade due to replication occurring from Series A 223-1 to Series B 223-2, and from Series B 223-2 to Series C 223-3. That is, replication occurs from each series 232 to the next serially. For example, Series 105-1 in FIG. 1C can be replicated as a second series in storage 115-1 (also illustrated in FIG. 1A) and then replicated from storage 115-1 into cloud storage 113 in a cascaded fashion. That is, a live series (e.g., series 105-1 that is in use) can be replicated to a local storage (e.g., storage 115-1 in FIGS. 1A and 1C located at the primary site 121 in FIG. 1C) and then subsequently, in serial fashion, to a remotely stored location (e.g., cloud storage 113). In this way, the series of snapshots is transferred from one location to the next in a serial fashion in order to backup the data in a number of types of location to preserve the stored data.

In some examples, an agent (e.g., agent 1 113-1 in FIG. 1A) associated with VCI 206 of FIG. 2A can manage both series A 223-1 and series B 223-2. In order to write into series B 223-2, the agent could push data to be written to an HBR server (e.g., server 111), and the server would write the data into the series. In this example, the HBR manager can serve as a proxy to transfer data.

Figure 2B:
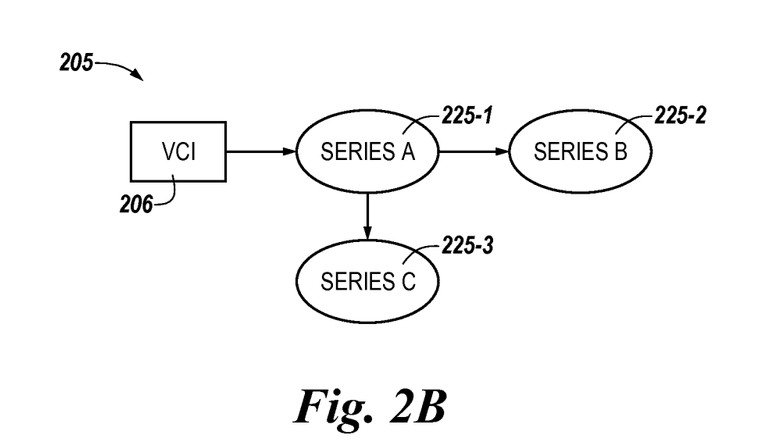
FIG. 2B is a block diagram of a fan-out of series of snapshots according to a number of embodiments of the present disclosure.

FIG. 2B is a block diagram of a fan-out 205 of series of snapshots according to a number of embodiments of the present disclosure. The series of snapshots is referred to as a fan-out due to Series A 225-1 being replicated to Series B 225-2 and Series A 225-1 also being replicated to Series C 225-3 in parallel. For example, Series 105-1 in FIG. 1C can be replicated as a second series to storage 115-1 and can also be replicated as a third series, Series 105-N, in the secondary location 123. That is, a live series (e.g., series 105-1) can be replicated to both a different live series at the secondary site 123 and a local storage (e.g., storage 115-1). The series now stored in the local storage 115-1 is then replicated to the cloud storage 113. The live series (105-N) at the secondary site 123 is also replicated to a local storage 115-N and then subsequently to the cloud storage 113. In this way, Series 105-1 is backed up in parallel to two locations to preserve the series of snapshots. In some embodiments, the replication of Series A 225-1 to Series B 225-2 and to Series C 225-3 can occur simultaneously, however embodiments are not limited to simultaneous replication for fan-out. While FIGS. 2A-2B illustrated three series (e.g., Series A 225-1, Series B 225-2, and Series C 225-3), examples are not limited. For example, any number of series of snapshots can be cascaded out (e.g., to additional series such as a Series D, Series E, etc.). Any number of series of snapshots can be fanned-out to additional series, such as Series A 225-2 being replicated to Series B 225-2 and Series C 225-2, as illustrated, along with being replicated to an additional Series D, Series E, etc., not illustrated.

Figure 3:
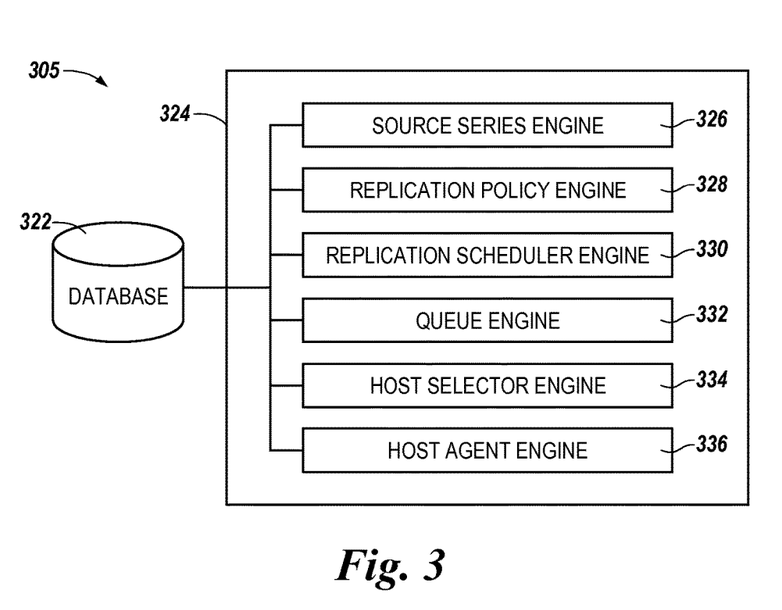
FIG. 3 is a block diagram of a host based replication manager for workflows for series of snapshots according to a number of embodiments of the present disclosure.

FIG. 3 is a block diagram of a system 305 for workflows for series of snapshots according to a number of embodiments of the present disclosure. The HBR manager 324 can include a number of engines, for example source series engine 326, replication policy engine 328, replication scheduler engine 330, queue engine 332, host selector engine 334, and/or host agent engine 336, and can be in communication with the storage location 322 via a communication link. The HBR manager 324 can include additional or fewer engines than illustrated to perform the various functions described herein. The HBR manager 324 can represent program instructions and/or hardware of a machine (e.g., machine 407 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware. Although illustrated and described with respect to the HBR manager 324, the number of engines can be associated with each server that manages replication.

The source series engine 326 can include a combination of hardware and program instructions that is configured to monitor a series of snapshots that is a source series for that series of snapshots. A source series is a series of snapshots that is stored in an on-premises storage (e.g., local storage 115-1 or local storage 115-2 in FIG. 1A). The source series engine 326 can monitor and keep track of which source series the HBR manager 324 is tasked with managing. For example, if a source series engine of the HBR manager 324 determines that the HBR manager 324 is tasked with managing that source series, the HBR manager 324 will manage the copying of the source series (e.g., parent series) of snapshots to subsequent series (e.g., child series) of snapshots. A parent series precedes a child series in the number of series of snapshots.

The replication policy engine 328 can include a combination of hardware and program instructions that is configured to receive and/or process a number of replication policies. For example, the replication policy engine 328 can receive a recovery point objective (RPO) associated with a series of snapshots. As used herein, a "recovery point objective" or "RPO" specifies an amount of time (e.g., a time skew) between a primary and secondary snapshot associated with a VCI. In some embodiments, the RPO can be specified by a user. For example, for a time skew of one minute, the data associated with a secondary snapshot should never be more than one minute out of date with respect to the data associated with a primary snapshot. To this end, a snapshot can be copied early enough that an amount of time required to perform the copy operation is less than the RPO, as described in more detail herein.

The replication scheduler engine 330 can include a combination of hardware and program instructions that is configured to determine a time point when a latest available snapshot from the source series will be copied to a database (e.g., database 117 in FIG. 1A which can refer to a cloud storage database). The time point can be determined based on a recovery point objective (RPO) defined in a user policy (e.g., such as defined by the replication policy engine 328). The determined time point is then used to schedule a replication and put the scheduled replication in a replication queue.

The queue engine 332 can include a combination of hardware and program instructions that are configured to perform a number of replication that are in a replication queue. The queued replications are executed in a first-come-first-served (FCFS) fashion. As a replication in the replication queue is the next in line to be performed, the queued replication is dispatched to a host agent to be executed.

The host selector engine 334 can include a combination of hardware and program instructions that are configured to select a host agent (e.g., a host agent of host agents 113-1, 113-2, 113-2 in FIG. 1A) to perform a replication of a series of snapshots. The HBR manager 324 can be coupled to a number of host agents (e.g., host agents that are on hosts as illustrated in FIG. 1A). The host selector engine 334 can monitor activity of the host agents via periodic application program interface (API) connections with the host agents. The host selector engine 334 can select a host agent based on whether the host agent performed a previous replication of the series of snapshots to a database or online series stored on local storage. By selecting a host agent that had previously replicated a same series of snapshots (e.g., by selecting an affined host agent, which refers to a previous affinity of the host agent with the series of snapshots), for example, an overhead cost of loading a database state of the series to the host agent, authentication with the database (e.g., a blobstore), and acquiring exclusive write permission for the series in the database can be avoided.

The HBR manager 324 can choose a new host agent (e.g., a host agent that had not previously performed a replication of the particular series of snapshots to be replicated) when there is no affined host agent (defined as a host agent without an affinity to a previously replicated series of snapshots), the host agent that previously replicated the series is currently overloaded, and/or the host agent can no longer access either the source series of the series to be replicated and/or the database (e.g., blobstore) and/or local storage.

The new host agent can be selected based on the host agent's connectivity to the source series of the series of snapshots and/or the database (e.g., blobstore) and/or the local storage on which the target series is to be stored, its resource availability (e.g., such as memory and number of threads), and a network throughput for an input and/or output to a database (e.g., blobstore) or remote storage. The selection of a host agent is further described in association with FIG. 4.

In some embodiments, the host agent engine 336 can include a combination of hardware and program instructions that is configured to connect to a selected host agent to replicate the particular series of snapshots and/or monitor the host agent as the host agent performs the replication. The host agent engine 336 can be in communication with the host selector engine 334 in order to provide information associated with a host agent's current activity and/or resource availability to perform replications. The communication between the host agent engine 336 and the host selector engine 334 allows for more efficient selection of host agents for performing a number of replications of series of snapshots.

Figure 4:
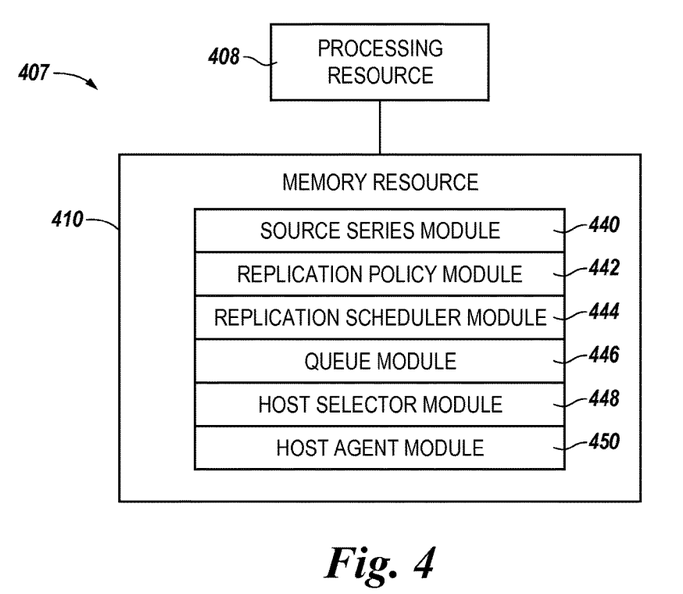
FIG. 4 is a block diagram of a machine for workflows for series of snapshots according to a number of embodiments of the present disclosure.

FIG. 4 is a block diagram of a machine 407 for workflows for series of snapshots according to a number of embodiments of the present disclosure. The machine 407 can utilize software, hardware, firmware, and/or logic to perform a number of functions. The machine 407 can be a combination of hardware and program instructions configured to perform a number of functions (e.g., actions). The hardware, for example, can include a number of processing resources 408 and a number of memory resources 410, such as a machine-readable medium (MRM) or other memory resources 410. The memory resources 410 can be internal and/or external to the machine 407 (e.g., the machine 407 can include internal memory resources and have access to external memory resources). In some embodiments, the machine 407 can be a virtual computing instance (VCI) or other computing device.

The program instructions (e.g., machine-readable instructions (MRI)) can include instructions stored on the MRM to implement a particular function (e.g., an action such as confirming that a credentialed user has design credentials associated with a website). The set of MRI can be executable by one or more of the processing resources 408. The memory resources 410 can be coupled to the machine 407 in a wired and/or wireless manner. For example, the memory resources 410 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 408 can be coupled to the memory resources 410 via a communication path 409. The communication path 409 can be local or remote to the machine 407. Examples of a local communication path 409 can include an electronic bus internal to a machine, where the memory resources 410 are in communication with the processing resources 448 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 460 can be such that the memory resources 410 are remote from the processing resources 408, such as in a network connection between the memory resources 410 and the processing resources 408. That is, the communication path 409 can be a network connection. Examples of such a network connection can include a local area network (LAN), wide area network (WAN), personal area network (PAN), and the Internet, among others.

As shown in FIG. 4, the MRI stored in the memory resources 410 can be segmented into a number of modules 440, 442, 444, 446, 448, and 450 that when executed by the processing resources 408 can perform a number of functions. As used herein a module includes a set of instructions included to perform a particular task or action. The number of modules 440, 442, 444, 446, 448, and/or 450 can be sub-modules of other modules. For example, the host agent module 450 can be a sub-module of the host selector module 448 and/or can be contained within a single module. Furthermore, the number of modules 440, 442, 444, 446, 448, 450 can comprise individual modules separate and distinct from one another. Examples are not limited to the specific modules 440, 442, 444, 446, 448, 450 illustrated in FIG. 4.

One or more of the number of modules 440, 442, 444, 446, 448, 450 can include program instructions and/or a combination of hardware and program instructions that, when executed by a processing resource 408, can function as a corresponding engine as described with respect to FIG. 3. For example, the host agent module 450 can include program instructions and/or a combination of hardware and program instructions that, when executed by a processing resource 408, can function as the host agent engine 336.

Figure 5:
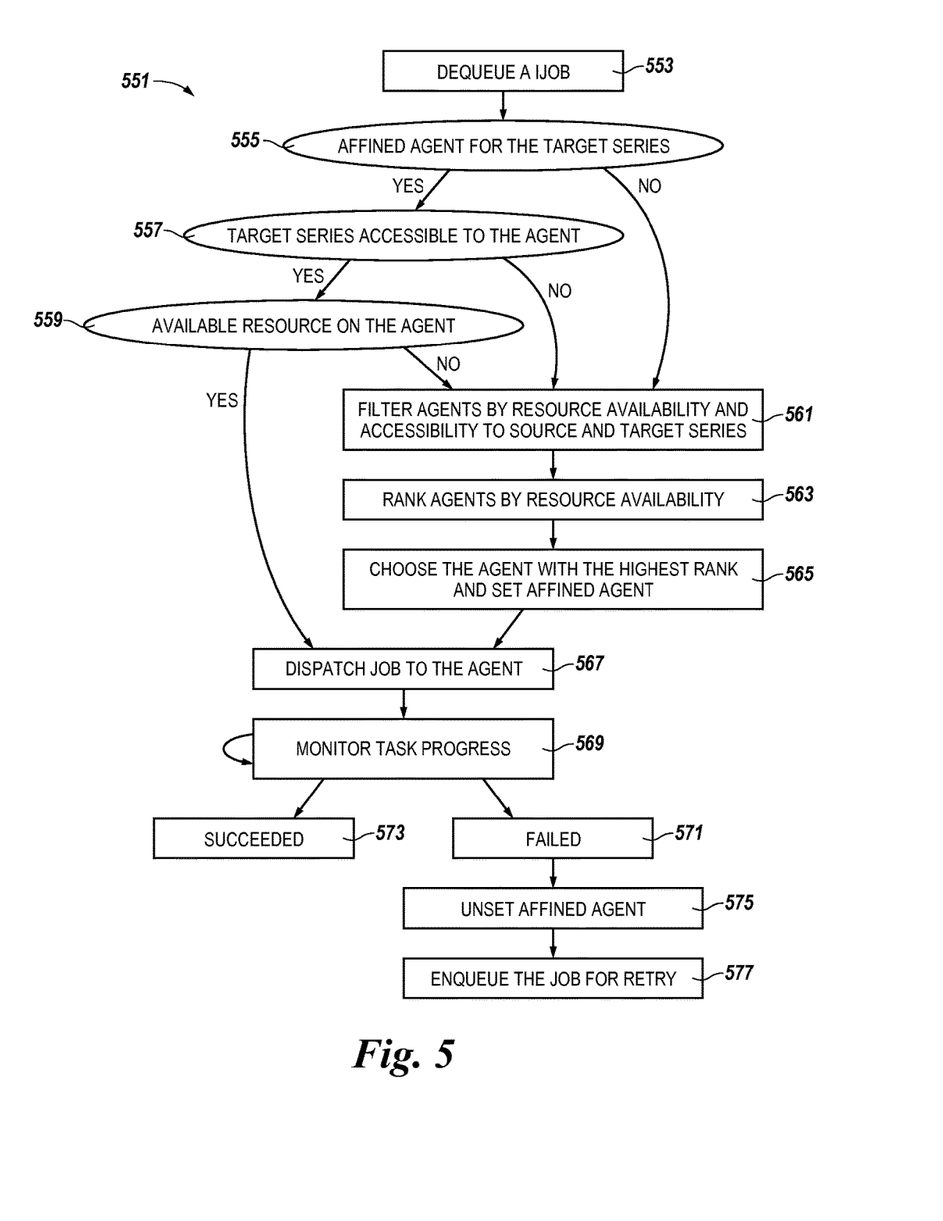
FIG. 5 is a flow chart illustrating a method for host agent selection according to a number of embodiments of the present disclosure.

FIG. 5 is a flow chart 551 illustrating a method for host agent selection according to a number of embodiments of the present disclosure. At 553, the method can include dequeuing a replication job from a replication queue (e.g., a replication queue managed by queue engine 332 in FIG. 3). That is, the method can include removing a replication job from a queue to perform the replication job. At 555, a determination of whether there is an affined agent for a target series can be performed. An affined agent can refer to a host agent that has previously performed a replication series associated with the target series to be replicated. When, at 555, there is an affined agent is determined, the method of flow chart 551 can proceed, at 557, to determine whether the target series is accessible to the agent. When it is determined, at 555, that there is no affined agent for the target series, the method can proceed, at 561, to filter host agents based on each host agent's resource availability and accessibility to a source series associated with the target series. That is, a number of host agents can be assessed to determine which host agent has the highest resource availability and/or accessibility to the source series associated with the target series. Resource availability can refer to a number of replications being performed by each host agent. Accessibility can refer to access of each of the host agents to a database that stores an associated source series of snapshots of the target series to be replicated.

When, at 557, it is determined that the target series is inaccessible to the affined agent, the method can proceed, at 561, to filter host agents based on each host agent's resource availability and accessibility to a source series associated with the target series. When, at 557, it is determined that the target series is accessible to the affined agent, a determination, at 559, can be performed to determine whether the affined host agent has available resources to perform the replication job. When the determination, at 559, indicates that the affined host does not have available resources to perform the replication job, the method can proceed, at 561, to filter host agents based on each host agent's resource availability and accessibility to a source series associated with the target series. At 561, when the host agents are filtered based on resource availability and accessibility to the source series associated with the target series, the method can include, at 563, ranking the filtered host agents by their resource availability. Host agents can be filtered (rather than picking an affined host agent) when at least one series of snapshots has not been replicated by an agent previously, when the previous agent has reached a threshold amount of activity, and when the previous agent does not have access to at least one of a source of the snapshots to cascade and/or fan out and the storage device.

At 565, a host agent of the ranked and filtered host agents with a highest rank can be chosen (e.g., selected). The chosen (e.g., selected) host agent, at 565, can be set as the host agent to perform the replication job from the queue. At 567, the replication job in the queue can be dispatched to the selected host agent to be performed by the selected host agent. When the determination, at 559, indicates that the affined host has available resources to perform the replication job, the method can proceed, at 567, to dispatch the replication job to the affined host agent.

At 569, the dispatched replication job, performed by either the selected host agent or the affined host agent with accessibility and resource availability, can be monitored for task progress. That is, the selected host agent or the affined host agent can be monitored to determine a progress of the replication of the target series of snapshots. The replication job from the queue is completed when a determination, at 573, indicates that the selected or affined host agent has succeeded in completing the replication job. When the replication job, at 571, is determined to have failed, the method can proceed, at 575, to unset the selected or affined host agent. When the affined host agent, at 575, is unset, the method can proceed, at 577, to enqueue the replication job for a retry either by the selected or affined host agent or an additionally selected host agent using the method described above.

Figure 6:
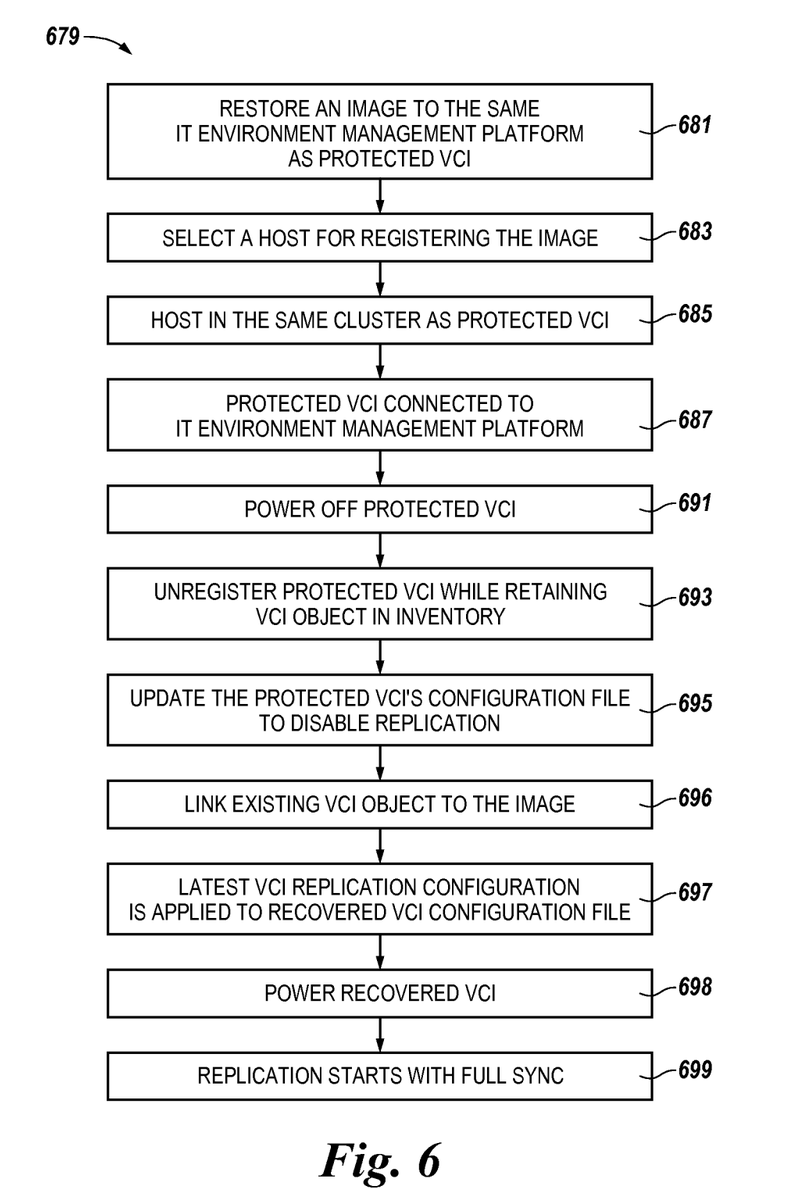
FIG. 6 is a flow chart illustrating a method of series workflow recovery according to a number of embodiments of the present disclosure.

FIG. 6 is a flow chart 679 illustrating a method of series workflow recovery according to a number of embodiments of the present disclosure. The method of flow chart 679 can be used to perform an in-place VCI recovery to retain policies for VCI services and VCI histories (e.g., events, alarms, etc.) after a VCI has failed. The in-place VCI recovery can retain the policies and histories to a series of snapshots stored in a same inventory as the failed VCI or a VCI image restored from a database (e.g., blobstore). The method of flow chart 679 includes, at 681, restoring an image associated with a protected VCI to a same information technology (IT) environment management platform as the protected VCI. A protected VCI refers to a VCI that includes one or more snapshot series that the information technology (IT) environment management platform is maintaining and/or is in the act of creating. An IT environment management platform can include a number of VCIs, hosts, local storages, data stores, and/or networks that can be accessed by a single login. A protected VCI refers to a VCI that has a saved backup stored to a database, such as a series of snapshots that can be referenced in order to protect data (e.g., replication policies) associated with the protected VCI from being lost.

At 683, a host is selected for registering the image associated with the protected VCI. At 685, a determination is performed to determine whether the selected host is in a same cluster of VCIs as the protected VCI. A determination of whether the protected VCI is connected to the IT environment management platform is performed at 687. When the protected VCI is determined to not be connected to the IT environment management platform, the image is removed from the IT environment management platform and the recovery is indicated as failed.

When the protected VCI is determined, at 687, to be connected to the IT environment management platform, the protected VCI is powered off, at 691. At 693, the protected VCI that is powered off is unregistered from the IT environment management platform and a VCI object associated with the protected VCI is retained in the IT environment management platform inventory. At 695, a VCI configuration file (e.g., .vmx file) of the protected VCI is updated to disable replication of the protected VCI. The VCI configuration file can store settings chosen in a VCI settings editor. At 696, the VCI object retained in the IT environment management platform inventory is linked (e.g. associated) with the restored image. At 697, the VCI configuration is flushed (e.g., cleared) and the VCI replication configuration is applied to the recovered VCI configuration file. At 698, the recovered VCI with the recovered VCI configuration file is powered on. At 699, replication of the recovered VCI starts and a full synchronization of the recovered VCI with the IT environment management platform is performed. A protected VCI can be recovered from more than one data source (e.g., a local storage, a cloud storage device). A determination of which local storage device to store the recovered VCI in can be based on how local a data source is in relation to the recovered VCI.

While an in-place recovery is described above, examples are no so limited. In some examples, an incremental recovery can be performed. An incremental recovery refers to restoring a VCI image on top of a seed. A seed can be a snapshot from a series of snapshots stored in a database. A determination of a difference between the seed and a snapshot to recover from can be performed. The differences can be merged (referred to as merged incremental recovery) and/or a new redo log can be created on top of the seed (referred to as linked incremental recovery. As an example, an in-place recovery can include a user selecting a PIT to recover to from a recovery series. A determination that a database stores a related snapshot series for the VCI can be performed. A server (e.g., an HBR server) can select a host to perform the recovery that can connect with both a source and target data store and request an agent associated with the server to perform the recovery. The selected host agent can determine what data needs to be copied from the recovery series into a base series. The host agent can check the two series to determine if a snapshot in both series represents the same PIT. The determination check can result in one of: no snapshots in one of the two series, snapshots in both series but none that represent the same PIT, and snapshots in both series and one or more series that represent the same PIT. If either of the first two scenarios occur (no snapshots in one of two series or snapshots in both series but none that represent the PIT), a host agent performs a full synch. For example, the host agent can perform a checksums to determine which data needs to be copied into the local storage (e.g., base disk) associated with the series.

If the third scenario occurs (snapshots in both series and one or more series that represent the same PIT), two approaches may be attempted. First, snapshots in the base series that are not common can be ignored. In this approach, a linked clone will be created from the common snapshot. Second, the snapshots in the base series that are not common can be leveraged. In this approach, a linked clone can be created off the top of the base series. After checking the two series to see if there is a snapshot in both series that represent the PIT, the host agent can create a linked clone VCI on top of the common snapshot and copy the missing data into it. The VCI can then be powered on.

In some examples, a linked cloned generated from an incremental recovery can be preserved even if a user decides to not proceed with a failover. For example, users may not know which particular PIT the users want to recover to. Therefore, the users download one PIT, test the one PIT, and, when the PIT does not perform as desired, the process of testing PITs can be repeated. In order to reduce an amount of data fetched from the recovery series, a system can maintain a cache of disk contents previously downloaded and use this cache when constructing a new PIT. A collection strategy (e.g., a garbage collection strategy) can be used to remove data that has a lesser probability of being used again. In some examples, a redo log can be created on top of a seed as described above and the contents written into it from the recovery series can be copied into the seed. Then, a second redo log can be created on top of the first redo log and the second redo log can be used as a running point of the VCI. That is, if the VCI writes data, the data can be held by the second redo log. When the user decides not to proceed with the recovery, the second redo log can be deleted and the first redo log can be retained for reuse. When a user selects a more recent PIT from a recovery series, two additional redo logs can be created onto a redo log that was retained from a first recovery attempt. When, however, an earlier PIT is selected, a new linked clone can be created from a point in the snapshot hierarchy below the retained redo log. A pruning strategy can run periodically to delete redo logs that are no longer in use. For example, a least-recently-used strategy can be used.

In some examples, a workflow can include a full synchronization (full synch) of a parent series. When the parent series is fully synched, a full synch to the child series occurs. A full synch to the child series can occur when a system requests a full synch to resolve error conditions. When there is a seed in the child series, the full synch to the child series can include computing and copying an incremental change between a latest snapshot of the parent series and a latest snapshot of the child series. An initial full synch to a child series is performed in parallel with an initial synch to a parent series, especially when there is no seed in the child series. A full synch can be started to a child series for a disk of a protected VCI after a full synch finishes for the disk of the parent series. This can create an incomplete snapshot of the child series as well as the parent series. Subsequent to the disks finishing a full synch for the child series and the first snapshot created for the parent series, a replication of the snapshot to the child series can be initiated. The full synch of different disks of a protected VCI can also be performed in parallel. A full synch from a parent series will trigger a full synch to a child series of the parent series. A full synch will abort any other in-progress replication of incremental snapshots. When a full synch fails, attempts to fully synch will continue to be tried a can pause a replication after a number (e.g., a few) retries.

In some examples, a workflow can include pausing an in-progress replication and resuming it at a later period of time. A host agent associated with the paused replication can cache a context of a stream of memory for ongoing replication. The stream of memory can include references and hashes of information (e.g., fine-grained files referred to as pack files). To pause a replication, a host agent can retain the stream and stop issuing new writes to external storage (e.g., cloud storage). The host agent can cache a task object reference and its progress. When a job is resumed on a same host agent, the job can be restarted from the cached stream and task context. When an HBR manager needs to switch to another host agent, the previous host agent can discard the cached state and fail the paused job. The new host agent can restart replication.

While replication of the parent series is paused, the child series can complete replication of snapshots associated with the child series initiated prior to the server management change. Since replication of the parent series and the child series is based on a recovery point objective (RPO) that indicates a minimum time interval between each replication, pausing replication of the parent series can cause an error due to violation of the RPO. The RPO can be suppressed until after the child series has completed replicating the snapshots to avoid an RPO error. If the RPO was not suppressed, when replication of the parent series is paused, the RPO would not be met and would indicate an error due to violation of the RPO. For example, an RPO of 5 minutes would not be met if the parent series was suppressed for an amount of time that would prevent the parent series from being replicated within the 5 minute time frame.

In some examples, a snapshot series can be moved to an additional data store managed at a same site (e.g., managed by a same server such as an HBR server). When replication of a child series is ongoing, replication can be impacted by moving the snapshot series. The replication of the snapshot series can be paused when initiating movement of the snapshot series to the child series. Replication can be resumed after movement of the snapshots is finished. Replication will be resumed with a different path for a source of the snapshots. Changing the path for the source snapshots should not affect a cached stream at a host agent of the snapshot series and therefore replication can be continued from a checkpoint before the pause.

Management of a replication of a number of series of snapshots can be switched from a first server (e.g., HBR manager 111 in FIG. 1A) to a second server based on a particular characteristic of the first and the second servers. For example, the second server may have more resource availability than the first server and the replication can be switched based on that availability. Switching from a first server to a second server can include deactivating management by a first server of at least one child series (such as Series B 223-2 in FIGS. 2A-2B). Data associated with the at least one child series is stored to a data store associated with the at least one child series (e.g., local storage 1 115-1 in FIG. 1A when the at least one child series is associated with host 1 102-1 and/or host 2 102-2, for example). Replication of the parent series is deactivated and data associated with the parent series is stored to the data store (e.g., local storage 1 115-1). Management of the parent series by the second server can be activated when replication of the parent series is deactivated. To activate management of the series, a second server can load the data for the series from a data store. The parent series can be loaded and then a child series can be loaded. After linking the two series as parent and child, the second server can start managing the two series. Management of the child series by the second server can also be activated when replication of the parent series is deactivated. The switching of the management of the parent series and the child series from the first server to the second server is initiated by at least one of a user and a manager engine of the server and the different server.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein.

Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   managing, with a server, replication of a number of series of snapshots of a virtual computing instance (VCI);
   replicating, with an on-host agent, a parent series of the number of series of snapshots to at least one child series of the number of series of snapshots, wherein the parent series precedes the at least one child series in the number of series of snapshots;
   subsequent to the replicating, propagating a change in the snapshots of the parent series to the child series including propagating one or more snapshots from the parent series to the child series; and
   switching management of the replication of the number of series of snapshots from the server to a different server, wherein switching management comprises:
      determining that the different server has more resource availability than the first server,
      deactivating replication of the parent series, and
      activating management of the parent series by the different server including loading the parent series from a data store.

2. The method of claim 1, wherein switching the management to the different server comprises:
   deactivating management by the server of the at least one child series; wherein data associated with the at least one child series is stored to the data store associated with the at least one child series.

3. The method of claim 2, where switching management of the at least one child series to the different server further comprises:
   activating management of the child series by the different server including loading the child series from the data store to the different server; and
   linking the loaded series as parent and child.

4. The method of claim 1, wherein the switching of the management of the parent series and the child series is initiated by at least one of a user and a manager engine of the server and the different server.

5. The method of claim 1, comprising pausing replication of the parent series, wherein the child series associated with the parent series replicates until the child series has completed replication of snapshots associated with the child series.

6. The method of claim 5, wherein replication of the parent series and the child series is based on a recovery point objective (RPO) that indicates a minimum time interval between each replication.

7. The method of claim 6, comprising suppressing the RPO after the child series has completed replicating the snapshots to avoid an error that would otherwise occur for a violation of the RPO.

8. The method of claim 1, comprising:
locating, in parallel, physical storage for the parent series and the child series; and
storing the parent series and the child series, in parallel, in the physical storage.

9. The method of claim 8, comprising updating the parent series and the child series in the physical storage when a change has occurred in at least one of the parent series and the child series.

10. A system, comprising:
one or more computers having one or more processors and one or more storage media having instructions that when executed perform operations comprising:
managing, with a server, replication of a number of series of snapshots of a virtual computing instance (VCI);
replicating, with an on-host agent, a parent series of the number of series of snapshots to at least one child series of the number of series of snapshots, wherein the parent series precedes the at least one child series in the number of series of snapshots;
subsequent to the replicating, propagating a change in the snapshots of the parent series to the child series including propagating one or more snapshots from the parent series to the child series; and
switching management of the replication of the number of series of snapshots from the server to a different server, wherein switching management comprises:
determining that the different server has more resource availability than the first server,
deactivating replication of the parent series, and
activating management of the parent series by the different server including loading the parent series from a data store.

11. The system of claim 10, wherein switching the management to the different server comprises:
deactivating management by the server of the at least one child series; wherein data associated with the at least one child series is stored to the data store associated with the at least one child series.

12. The system of claim 11, where switching management of the at least one child series to the different server further comprises:
activating management of the child series by the different server including loading the child series from the data store to the different server; and
linking the loaded series as parent and child.

13. The system of claim 10, wherein the switching of the management of the parent series and the child series is initiated by at least one of a user and a manager engine of the server and the different server.

14. The system of claim 10, wherein the instructions when executed further comprise pausing replication of the parent series, wherein the child series associated with the parent series replicates until the child series has completed replication of snapshots associated with the child series.

15. The system of claim 14, wherein replication of the parent series and the child series is based on a recovery point objective (RPO) that indicates a minimum time interval between each replication.

16. The system of claim 15, comprising suppressing the RPO after the child series has completed replicating the snapshots to avoid an error that would otherwise occur for a violation of the RPO.

17. The system of claim 10, comprising:
locating, in parallel, physical storage for the parent series and the child series; and
storing the parent series and the child series, in parallel, in the physical storage.

18. The system of claim 17, comprising updating the parent series and the child series in the physical storage when a change has occurred in at least one of the parent series and the child series.

19. A non-transitory machine-readable medium storing instructions executable by a processing resource to cause a computing system to perform operations comprising:
managing, with a server, replication of a number of series of snapshots of a virtual computing instance (VCI);
replicating, with an on-host agent, a parent series of the number of series of snapshots to at least one child series of the number of series of snapshots, wherein the parent series precedes the at least one child series in the number of series of snapshots;
subsequent to the replicating, propagating a change in the snapshots of the parent series to the child series including propagating one or more snapshots from the parent series to the child series; and
switching management of the replication of the number of series of snapshots from the server to a different server, wherein switching management comprises:
determining that the different server has more resource availability than the first server,
deactivating replication of the parent series, and
activating management of the parent series by the different server including loading the parent series from a data store.

* * * * *